United States Patent
Leighton et al.

(10) Patent No.: US 12,541,378 B2
(45) Date of Patent: Feb. 3, 2026

(54) SYSTEMS AND METHODS FOR GENERATING AND PROVIDING A DYNAMIC USER INTERFACE

(71) Applicant: Wells Fargo Bank, N.A., San Francisco, CA (US)

(72) Inventors: Andrea Renee Leighton, San Francisco, CA (US); Alexander Youngblood Windsor, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 137 days.

(21) Appl. No.: 18/235,317

(22) Filed: Aug. 17, 2023

(65) Prior Publication Data

US 2025/0060976 A1 Feb. 20, 2025

(51) Int. Cl.
*G06F 9/451* (2018.01)
*G06F 16/951* (2019.01)
*G06F 16/957* (2019.01)

(52) U.S. Cl.
CPC ............ *G06F 9/451* (2018.02); *G06F 16/951* (2019.01); *G06F 16/9577* (2019.01)

(58) Field of Classification Search
CPC ..... G06F 9/451; G06F 16/951; G06F 16/9577
See application file for complete search history.

(56) References Cited

U.S. PATENT DOCUMENTS

| | | | |
|---|---|---|---|
| 4,924,773 A | 5/1990 | Gwilliam | |
| D755,231 S | 5/2016 | Gary et al. | |
| D801,380 S | 10/2017 | Yamasaki | |
| D835,672 S | 12/2018 | Vijay et al. | |
| D840,432 S | 2/2019 | Haverstock et al. | |
| 10,621,598 B1 | 4/2020 | Greenwald | |
| D888,094 S | 6/2020 | Elgena | |
| 10,745,918 B2 | 8/2020 | Fringero | |
| 11,138,440 B1 | 10/2021 | Wang et al. | |
| D947,869 S | 4/2022 | Yajurvedi | |

(Continued)

FOREIGN PATENT DOCUMENTS

CN 305498922 S 12/2019

OTHER PUBLICATIONS

"Flat icon red rounded button vector illustration", 2019, https://www.istockphoto.com/vector/heart-icon-flat-red-round-button-vector-illustration-gm 1162427736-318844823.

(Continued)

*Primary Examiner* — Daniel W Parcher
(74) *Attorney, Agent, or Firm* — Foley & Lardner LLP (57) ABSTRACT

A computing system includes a processing circuit to receive a URL associated with a web page and a category type of a third party system; parse the web page to extract an audio or visual content item; determine the category type matches a category of a plurality of categories stored in a database; retrieve, from the database, at least one image or video associated with the category; receive a selection of a graphical representation of the third party system on a first graphical user interface (GUI) rendered by a user device; generate a second GUI including at least the extracted content item and the at least one image or video retrieved from the database; and transmit data corresponding to the second GUI for rendering on the user device.

18 Claims, 6 Drawing Sheets

(56) References Cited

U.S. PATENT DOCUMENTS

| | | |
|---|---|---|
| D956,814 S | 7/2022 | Bennett et al. |
| D973,714 S | 12/2022 | Fogu |
| D989,090 S | 6/2023 | Richman et al. |
| D994,805 S | 8/2023 | Hu et al. |
| 11,941,417 B1 * | 3/2024 | Kim .................. G06F 9/451 |
| D1,021,932 S | 4/2024 | Fogu |
| 2004/0078276 A1 | 4/2004 | Shimogori |
| 2004/0098467 A1 * | 5/2004 | Dewey .................. H04L 69/329 |
| | | 709/219 |
| 2009/0043695 A1 | 2/2009 | Hickey |
| 2009/0048860 A1 * | 2/2009 | Brotman .............. G06Q 20/123 |
| | | 700/26 |
| 2009/0192873 A1 | 7/2009 | Marble |
| 2010/0049631 A1 | 2/2010 | Goldman |
| 2011/0295749 A1 | 12/2011 | Scalisi |
| 2013/0097543 A1 | 4/2013 | Su et al. |
| 2013/0170938 A1 | 7/2013 | Lowden |
| 2013/0339121 A1 | 12/2013 | Bowden |
| 2014/0164275 A1 | 6/2014 | Lee |
| 2014/0257991 A1 | 9/2014 | Christensen et al. |
| 2014/0304187 A1 | 10/2014 | Menn |
| 2014/0358754 A1 | 12/2014 | Breeden et al. |
| 2015/0066790 A1 | 3/2015 | Desanti |
| 2015/0302453 A1 | 10/2015 | Tietzen et al. |
| 2016/0027072 A1 | 1/2016 | Dreicer et al. |
| 2016/0343043 A1 | 11/2016 | Hicks et al. |
| 2017/0076309 A1 | 3/2017 | Baron et al. |
| 2017/0193495 A1 | 7/2017 | Conte et al. |
| 2018/0203571 A1 * | 7/2018 | Dayanandan .............. G06F 8/38 |
| 2018/0203674 A1 * | 7/2018 | Dayanandan .............. G06F 8/35 |
| 2018/0276710 A1 | 9/2018 | Tietzen et al. |
| 2019/0220908 A1 | 7/2019 | Wilkes |
| 2020/0236211 A1 | 7/2020 | Taktak |
| 2020/0279305 A1 | 9/2020 | Mossoba et al. |
| 2020/0311790 A1 | 10/2020 | Keren |
| 2021/0224255 A1 * | 7/2021 | Mansour .................. H04L 51/04 |
| 2021/0342936 A1 | 11/2021 | Cariveau |
| 2021/0358754 A1 | 11/2021 | Masuoka et al. |
| 2021/0398179 A1 | 12/2021 | Kolaja et al. |
| 2022/0050667 A1 * | 2/2022 | Schoppe ................. G06N 20/00 |
| 2022/0101609 A1 | 3/2022 | Hu et al. |
| 2022/0365740 A1 | 11/2022 | Chang et al. |
| 2023/0132457 A1 * | 5/2023 | Ghamsari ............ G06F 16/2365 |
| | | 705/28 |
| 2023/0237461 A1 | 7/2023 | Tsifrin et al. |
| 2024/0273490 A1 * | 8/2024 | Martin ............... G06Q 20/3676 |

OTHER PUBLICATIONS

"Happy Fall Y'all", 2020 https://www.1200somemiles.com/2020/09/happy-fall-yall.html.

"Heart icon flat prime red round button stock illustration", Dec. 4, 2018, iStock.com, https://www.istockphoto.com/vector/heart-icon-flat-pri me-red-round-button-gm 107 4885296-287734142?searchscope=i mage%2Cfilm.

* cited by examiner

SYSTEMS AND METHODS FOR GENERATING AND PROVIDING A DYNAMIC USER INTERFACE

TECHNICAL FIELD

The present disclosure relates to systems and methods for generating and providing a dynamic user interface.

BACKGROUND

Web scraping algorithms may be useful for extracting various information from one or more websites associated with an entity. Conventionally, such algorithms may be resource intensive and may require a significant amount of processing power. Therefore, it may be valuable to supplement and/or replace scraped information from such websites with related stock content based on known information regarding the entity. Accordingly, computerized systems and methods to reduce processing power and computing resources by utilizing stock information may be desired.

SUMMARY

At least one arrangement relates to a computing system of a provider institution, comprising: a network interface configured to communicate with a user device and a plurality of third party systems; a database structured to store a plurality of stock images or videos associated with a plurality of categories; and at least one processing circuit comprising at least one processor and at least one memory, the at least one memory structured to store instructions that are executable to cause the at least one processor to: receive, via the network interface, a uniform resource location (URL) associated with a web page and a category type of a first third party system of the plurality of third party systems; parse the web page associated with the URL to extract a content item from the web page, the content item comprising an audio or visual content item; determine the category type matches a category of the plurality of categories stored in the database, based on a comparison of the received category type with the plurality of categories; retrieve, from the database, at least one image or video associated with the category; receive, via the network interface, a selection of a graphical representation of the first third party system on a first graphical user interface (GUI) rendered by the user device; generate a second GUI including at least the extracted content item and the at least one image or video retrieved from the database; and transmit, via the network interface, data corresponding to the second GUI for rendering to the user device.

At least one arrangement relates to a computer-based method, comprising: receiving, by a computing system of a provider institution, a uniform resource location (URL) associated with a web page and a category type of a first third party system of a plurality of third party systems; parsing, by the computing system, the web page associated with the URL to extract a content item from the web page, the content item comprising an audio or visual content item; determining, by the computing system, the category type matches a category of a plurality of categories stored in a database of the provider institution, based on a comparison of the received category type with the plurality of categories; retrieving, from the database, by the computing system, at least one image or video associated with the category; receiving, by the computing system, a selection of a graphical representation of the first third party system on a first graphical user interface (GUI) rendered by a user device; generating, by the computing system, a second GUI including at least the extracted content item and the at least one image or video retrieved from the database; and transmitting, by the computing system, data corresponding to the second GUI for rendering to the user device.

At least one arrangement relates to a non-transitory computer readable medium storing instructions that, when executed by at least one processor, cause the at least one processor to: receive, via a network interface, a uniform resource location (URL) associated with a web page and a category type of a first third party system of a plurality of third party systems; parse the web page associated with the URL to extract a content item from the web page, the content item comprising an audio or visual content item; determine the category type matches a category of a plurality of categories stored in a database, based on a comparison of the received category type with the plurality of categories; retrieve, from the database, at least one image or video associated with the category; receive, via the network interface, a selection of a graphical representation of the first third party system on a first graphical user interface (GUI) rendered by a user device; generate a second GUI including at least the extracted content item and the at least one image or video retrieved from the database; and transmit, via the network interface, data corresponding to the second GUI for rendering to the user device.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Referring generally to the figures, systems and methods for generating and providing a dynamic and selective graphical user interface are disclosed according to various embodiments herein. The systems and methods described herein may receive a plurality of third party information (e.g., a category type, name, website link, etc.) of one or more third party systems during a registration process for a resource transfer service of a provider institution. The systems and methods described herein may determine if a web page (e.g., a link to a web page) associated with the third party system was received with the third party information. If a web page was received, the systems and methods described herein may parse the web page for media (e.g., images, videos, etc.) associated with the third party system. If the web page includes media, the systems and methods described herein may extract the media from the web page using one or more web scraping algorithms. The systems and methods described herein may store the received third party information and/or the extracted media in a third party database. The systems and methods described herein may compare the received information (e.g., a selected category type) with stored data (e.g., stored category types) in a stock database. The systems and methods described herein may determine if the selected category type matches at least one of the plurality of category types stored in the stock database. If the category type matches at least one stored category type, the systems and methods described herein may pull stock images or videos from the stock database associated with the matching category type.

The systems and methods described herein may generate and provide a graphical user interface including a graphical representation of at least one third party system based on the third party information. The systems and methods described herein may receive an input to the user interface indicating a selection of a graphical representation corresponding to a third party system. The systems and methods described herein may generate and provide another user interface including the extracted media from the web page of the corresponding third party system and/or at least one pulled stock image or video from the stock database based on the matching category type. The systems and methods described herein may dynamically update, shuffle, and/or switch out at least one extracted media from the web page and/or the at least one pulled stock image or video rendered on the user interface.

During a resource transfer process (e.g., transactions and/or donations), providing information, such as images, videos, and/or other information, to a sender regarding a recipient may facilitate ensuring a resource transfer is not fraudulent. In some circumstances, web scraping public information regarding a recipient may facilitate extracting such information. However, conventional techniques for extracting various media from a web page using one or more web scraping algorithms can be resource intensive and often requires a large amount of processing power due to the intensity of the processes performed. Therefore, by selectively providing predetermined and stored stock images from a stock library of images in additional to or instead of web scraped images or videos, the systems and methods described herein facilitate minimizing computing resources. For example, the systems and methods described herein provide a real-time user interface including various visuals associated with a recipient (e.g., a third party system) utilizing a stock visuals database to replace and/or supplement any scraped images, thereby significantly reducing computing resources and processing power. Additionally, combining scraped images and stock images is not routine or conventional. For example, it is unconventional to combine or replace stock images with actual images directly associated with a third party system based on public information associated with the third party system. Various other technical benefits and advantages are described in greater detail below.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
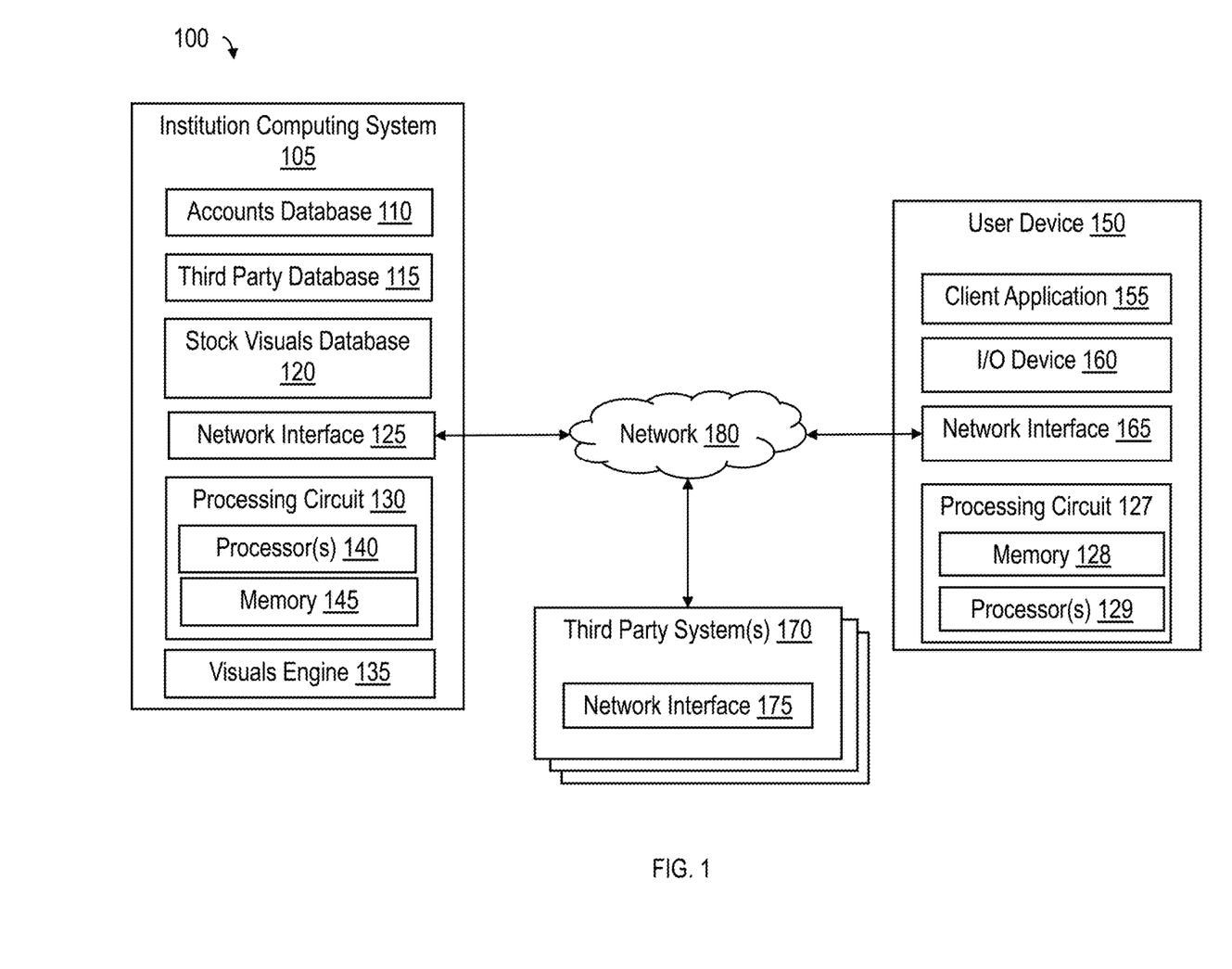
FIG. 1 is a block diagram of a computing environment for generating and providing a dynamic user interface, according to an example embodiment.

FIG. 1 is a diagram of a computing environment 100 for generating and providing dynamic graphical user interfaces during a donation process, according to an example embodiment. As shown, the computing environment 100 includes one or more institution computing systems 105 associated with a provider (e.g., a financial institution), one or more user devices 150 associated with one or more users, and/or one or more third party systems 170. The institution computing system(s) 105, the user device(s) 150, and the third party system(s) 170 are in communication with each other and are connected by a network 180, which may include one or more of the Internet, cellular network, Wi-Fi, Wi-Max, a proprietary banking network, or any other type of wired or wireless network or a combination of wired and wireless networks. As described herein, the computing environment 100 may be used to receive third party information of one or more third party systems 170, compare the received third party information, extract one or more content items, and provide specific and dynamic user interfaces to a user device 150 based on the extracted content items.

For clarity, the following description will refer to an institution computing system 105 and a third party system 170. However, it will be understood that the following description of any of these devices and computing systems will be similarly applicable to any additional corresponding devices and computing systems (e.g., additional institution computing systems 105 or third party systems 170) and that, in some embodiments, the computing environment 100 may include a plurality of any of the described devices and systems.

The institution computing system 105 is owned by, associated with, or otherwise operated by a provider institution (e.g., a bank or other financial institution) that maintains one or more accounts held by various customers (e.g., the customer associated with the user device 150), such as demand deposit accounts, credit card accounts, receivables accounts, and so on. In some instances, the institution computing system 105, for example, may include one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the institution computing system 105 may be or may include various other devices communicably coupled thereto, such as, for example, desktop or laptop computers (e.g., tablet computers), smartphones, wearable devices (e.g., smartwatches), and/or other suitable devices.

In some embodiments, the institution computing system 105 includes an accounts database 110, a third party database 115, a stock visuals database 120, a network interface 125, a visuals circuit 135, and at least one processing circuit 130 having at least one processor 140 and at least one memory 145. In some instances, the network interface 125 includes, for example, program logic that connects the institution computing system 105 to the network 180. The network interface 125 facilitates secure communications between the institution computing system 105 and each of the user device(s) 150 and third party system(s) 170. The network interface 125 also facilitates communication with other entities, such as other banks, settlement systems, and so on. The network interface 125 further includes user interface program logic configured to generate and present web pages to users accessing the institution computing system 105 over the network 180.

The institution computing system 105 may include at least one visuals circuit 135. The visuals circuit 135 is structured or configured to perform a variety of functionalities or operations to enable and monitor various third party system activities (e.g., account registration of a service of the provider institution described herein) in connection with the third party database 115 and/or the stock visuals database 120. For example, the visuals circuit 135 may be configured to monitor and/or pull information from various third party systems 170, store the information in the third party database 115 and/or compare the information with data stored in the stock visuals database 120, and/or various other functionalities as described herein. In some implementations, the visuals circuit 135 is structured or configured to perform a variety of functionalities or operations to facilitate extracting a content item of the receiving third party information (e.g., using one or more web scraping algorithms as described herein). The visuals circuit 135 may be structured or configured to enable and monitor various customer activities (e.g., account processing, payment processing, etc.) in connection with customer account information store within the accounts database 110. For example, the visuals circuit 135 may be configured to monitor and/or pull data from one or more customer accounts associated with the user device 150, and/or a variety of other functionalities, as described in greater detail with reference to FIGS. 2-4F.

The accounts database 110 is structured or configured to retrievably store account information associated with various customers having accounts at the provider institution. In some instances, the account information may include a customer name, transaction history, a phone number, an e-mail address, a physical address, a token (e.g., a tag or address associated with a particular account), account information and/or number, etc. of the customer accounts. In some instances, the account information may include transaction information, information pertaining to the type and corresponding capabilities of the given account, a service token (e.g., a phone number, an e-mail address, or a tag associated with a particular service account) associated with the customer account, etc. of the customer account.

The stock visuals database 120 is structured or configured to retrievably store a plurality of images, videos, and/or other media associated with a list of category types. For example, each category type may include a plurality of preselected and stored images, video, or other media relating to the category. In some instances, the stored images, videos, and other media may include one or more stock images. For example, for an "animal" category type, the stock visuals database 120 may be configured to store images, videos, and/or other media of various types of animals. For example, the stock visuals database 120 may be configured to store a plurality of category types (e.g., animals, arts, children, education, emergency relief, environment, health, international, poverty, public benefit, military, religion, social services, other, etc.) and a plurality of images, videos, and/or other visuals each associated with (e.g., tagged) a particular category type. In some implementations, the stock visuals database 120 is structured or configured to retrievably store a plurality of stock graphical representations that can be modified based on specific datapoints. For example, the stock visuals database 120 may be configured to store various graphs (e.g., line graph, pie chart, bar graph, etc.), and/or other graphics (e.g., cylinder/thermometer, icons, etc.) to depict a status relative to a goal as described herein.

The third party database 115 is structured or configured to retrievably store third party information associated with various third party systems 170. In some instances, the third party information may include a name, a phone number, an e-mail address, a physical address, a website address (e.g., uniform resource location (URL)), a token (e.g., a tag or address associated with a particular account), account information, donation history, a donation goal, whether the third party would match a donation, a description, a predetermined selected category, etc. of the third party system 170. The third party database 115 may be structured to store the third party information responsive to receiving the information from one or more third party systems 170 during a registration process for a service of the provider institution associated with the institution computing system 105 as described herein.

The user device 150 is owned, operated, controlled, managed, and/or otherwise associated with a customer (e.g., a customer of the financial institution). In some embodiments, the user device 150 may be or may include, for example, a desktop or laptop computer (e.g. a tablet computer), a smartphone, a wearable device (e.g., a smartwatch), a personal digital assistant, and/or any other suitable computing device. In the example shown, the user device 150 is structured as a mobile computing device, namely a smartphone.

In some embodiments, the user device 150 includes one or more I/O devices 160, a network interface 165, and one or more client applications 155. While the term "I/O" is used, it should be understood that the I/O devices 160 may be input-only devices, output-only devices, and/or a combination of input and output devices. In some instances, the I/O devices 160 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the customer to provide inputs (such as a touchscreen display, stylus, keyboard, force sensor for sensing pressure on a display screen, etc.). In some instances, the I/O devices 160 further include one or more user interfaces (devices or components that interface with the customer), which may include one or more biometric sensors (such as a fingerprint reader, a heart monitor that detects cardiovascular signals, face scanner, an iris scanner, etc.).

The network interface 165 includes, for example, program logic and various devices (e.g., transceivers, etc.) that connect the user device 150 to the network 180. The network interface 165 facilitates secure communications between the user device 150 and each of the institution computing system 105 and/or the third party system 170. The network interface 165 also facilitates communication with other entities, such as other banks, settlement systems, and so on.

The user device 150 includes at least one processing circuit 127 having at least one memory 128 and at least one processor 129. The user device 150 stores in computer memory 128, and executes ("runs") using one or more processors 129, various client applications 155, such as an Internet browser presenting websites, text messaging applications (e.g., for sending MMS or SMS to the institution computing system 105 and/or third party system 170), and/or applications provided or authorized by entities implementing or administering any of the computing systems in computing environment 100.

For example, in some instances, the client applications 155 include a customer client application (e.g., a financial institution banking application) provided by and at least partly supported by the institution computing system 105. For example, in some instances, the client application 155 coupled to the institution computing system 105 may enable the customer to perform various customer activities (e.g., account management, tracking, etc.) and/or perform various transactions (e.g., transferring money to a particular merchant, etc.) associated with one or more customer accounts of the customer held at the provider institution associated with the institution computing system 105 (e.g., account opening and closing operations, fund transfers, etc.). The client application 155 may be referred to as a provider institution client application herein. In some arrangements, the client applications 155 are hard coded onto the memory of the user device 150. In another embodiment, these applications are web-based interface applications, where the user has to log onto or access the web-based interface before usage, and these applications are supported by a separate computing system comprising one or more servers, processors, network interface circuits, or the like (e.g., the institution computing system 105), that transmit the applications for use to the mobile device. In some arrangements, the client application 155 may be an application downloaded by a user via an app store or mobile wallet provider.

In some instances, the client application 155 provided by the institution computing system 105 may additionally be coupled to the third party system(s) 170 (e.g., via one or more application programming interfaces (APIs) and/or software development kits (SDKs)) to integrate one or more features or services provided by the third party system(s) 170. In some instances, the third party system(s) 170 may alternatively and/or additionally provide services via a separate client application 155.

The third party system 170 includes a respective network interface 175 to facilitate exchanging data with the institution computing system 105 and/or the user device 150 through the network 180. The third party system 170 may be associated with a third party entity. For example, the third party entity may be or may include various organizations including, but not limited to, charities, non-profit organizations, and/or any entity capable of receiving a donation. The third party system 170 may include one or more APIs and/or servers associated with the third party entity for exchanging data with the institution computing system 105 and/or the user device 150, as described herein.

With an example structure of the computing environment 100 being described above, example processes performable by the computing environment 100 (or components/systems thereof) will be described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Figure 2:
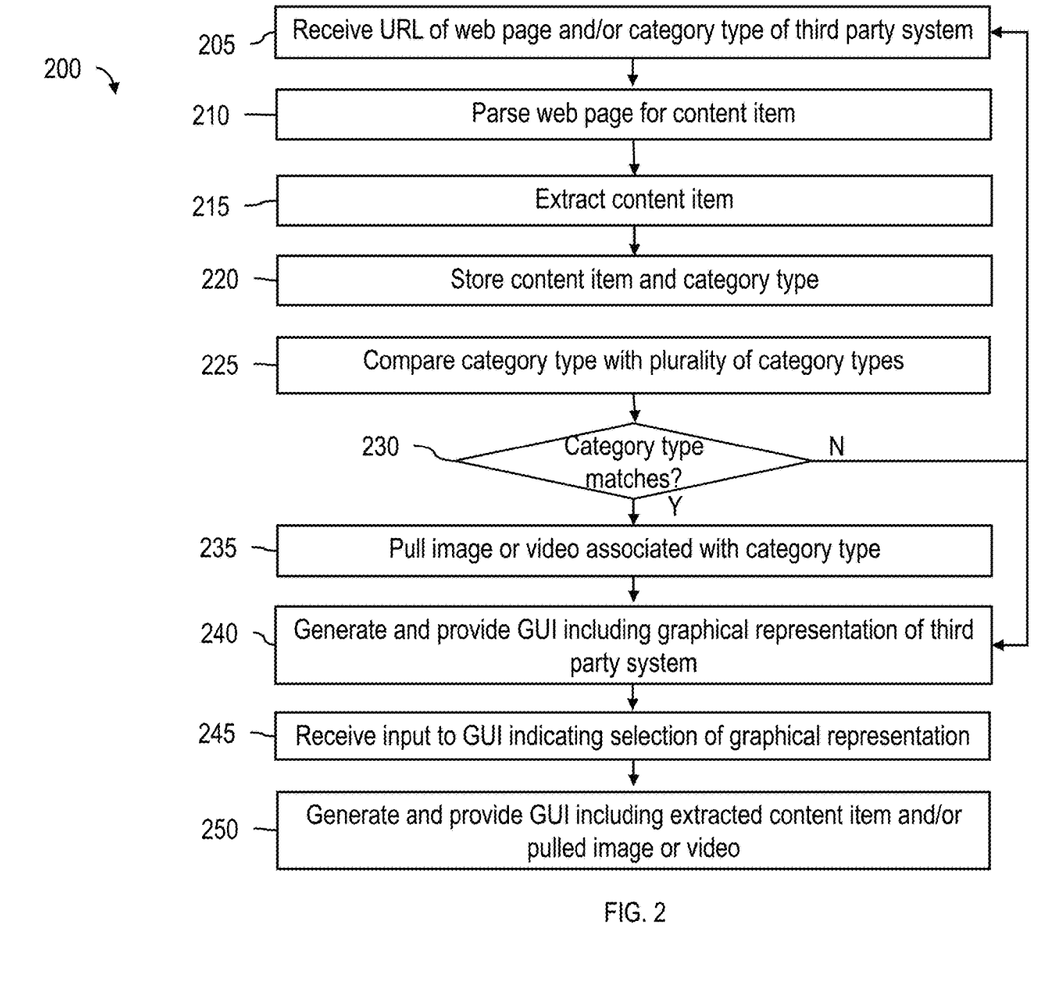
FIG. 2 is flow diagram of a method for generating and providing a dynamic user interface, according to an example embodiment.

Referring now to FIG. 2, a flow diagram of a method 200 of generating and providing specific and dynamic graphical user interfaces is shown, according to an example embodiment. Various operations of the method 200 may be conducted by the computing environment 100 and particularly parts thereof (e.g., the institution computing system 105, the user device 150, and/or the third party system 170.)

As a brief overview, at process 205, the institution computing system 105 (e.g., the visuals circuit 135) receives a URL associated with a web page and/or a category type of a third party system 170. At process 210, the visuals circuit 135 parses the web page for content. At process 215, the visuals circuit 135 extracts a content item. At process 220, the visuals circuit 135 stores the content item and/or the category type. At process 225, the visuals circuit 135 compares the category type with a plurality of stored category types. At process 230, the visuals circuit 135 determines if the category type matches at least one of the plurality of stored category types. If the visuals circuit 135 determines the category type does not match, the visuals circuit 135 may return to process 205 or the visuals circuit 135 may proceed to process 240. If the visuals circuit 135 determines the category type matches, the visuals circuit 135 may proceed to process 235 in which the visuals circuit 135 pulls an image or video associated with the matching category type. At process 240, the visuals circuit 135 generates and provides a graphical user interface including a representation of the third party system 170. At process 245, the visuals circuit 135 receives an input to the graphical user interface indicating a selection of the graphical representation. At process 250, the visuals circuit 135 generates and provides a graphical user interface including the extracted content item and/or the pulled image or video.

In greater detail, at process 205, the institution computing system 105 (e.g., the visuals circuit 135) receives various information of one or more third party systems 170 during a registration process of the one or more third party systems 170 with a service of the provider associated with the institution computing system 105. For example, in some implementations, the visuals circuit 135 may be configured to receive one or more data packets (e.g., digitalized versions of one or more documents, etc.) including the third party information during a registration process of at least one third party system 170. The visuals circuit 135 may be configured to receive the third party information responsive to transmitting a request for information to the third party system(s) 170 for registering the third party entity of the third party system 170 with a service (e.g., a donation service) of the institution computing system 105. The request may include, for example, a predefined file format for a user of the third party entity associated with the third party system 170 to complete and transmit back to the institution computing system 105. The visuals circuit 135 may be configured to extract the third party information from the predefined file format.

By way of example, the visuals circuit 135 may be configured to transmit a message (e.g., email, SMS, notification, etc.) to a device associated with the third party system 170 (e.g., to an end user device similar to the user device 150 described herein). The message may include one or more manual fields/inputs/user interface elements for a user of the device associated with the third party system 170 to complete or provide values to provide the third party information (e.g., a selection of a category type, URL, name, address, tokens and/or identifiers, employer identification number (EIN), a bank routing number, a bank account number, a donation goal, whether the third party would match a donation, and/or other various information). The visuals circuit 135 may be configured to receive the third party information responsive to the third party system 170 transmitting the completed message back to the institution computing system 105 to complete the registration. The visuals circuit 135 may be configured to store the third party information in the third party database 115. The visuals circuit 135 may be configured to receive third party information from a plurality of third party systems 170 each associated with a unique third party entity. The visuals circuit 135 may be configured to store each of the received information within the third party database 115.

Figure 3:
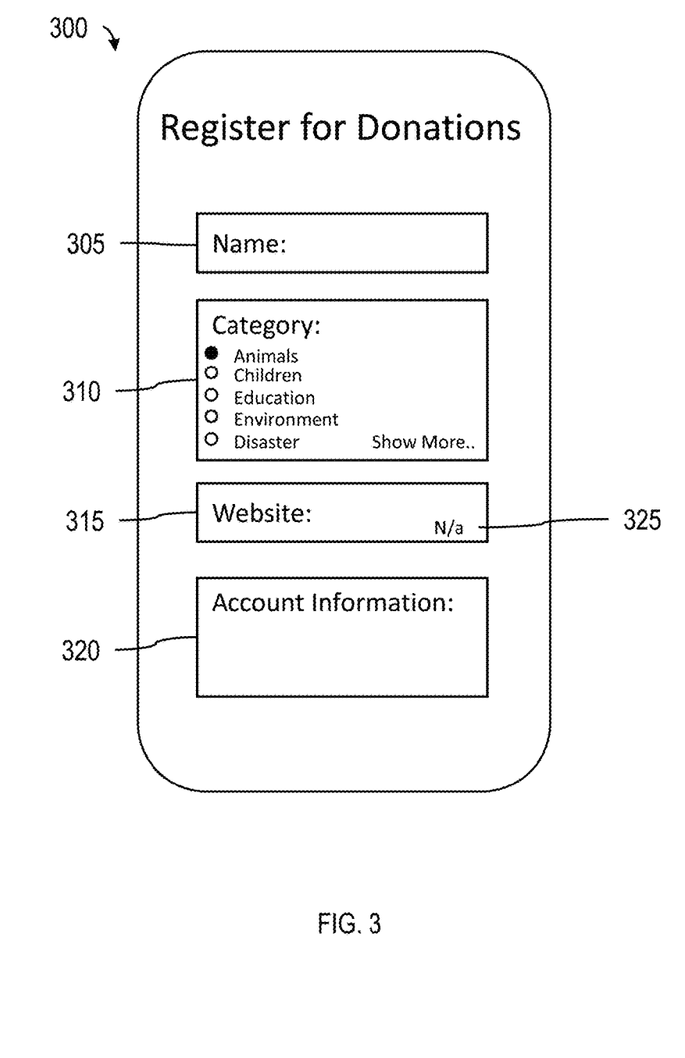
FIG. 3 is a graphical user interface presented to a third party system for registering for a service of a provider, according to an example embodiment.

In some implementations, the third party information may include a selection of a finite number of category types (e.g., animals, arts, children, education, emergency relief, environment, health, international, poverty, public benefit, military, religion, social services, other, etc.). For example, FIG. 3 depicts an example user interface 300 generated by the institution computing system 105 (e.g., the visuals circuit 135) and provided to a device (e.g., having a similar configuration as the user device 150) of the third party system 170. As depicted in FIG. 3, the user interface 300 may include a plurality of selectable features to receive the third party information including, but not limited to, a name input 305, a category input 310, a website input 315, and/or an account information input 320. The visuals circuit 135 may be configured to receive a name of a third party entity via the name input 305, a selection of at least one category type via the category input 310 (e.g., via a manual input to one or more of a plurality of selectable category types), a URL link via the website input 315, and/or an account name, number, or other information via the account information input 320. In some implementations, the user interface 300 may include a selectable feature 325 indicating that a third party entity is not associated with a website. The user interface 300 depicted in FIG. 3 is for illustrative purposes. In some implementations, the user interface 300 may include more or less selectable features including ones to receive donation history information, a donation goal, a description, and/or various other details associated with a third party system 170. In some implementations, the user interface 300 may include at least one dialogue box for a user of the third party entity associated with a third party system 170 to enter a new category type (e.g., if the third party entity does not belong with any of the predetermined category types).

In some implementations, the visuals circuit 135 may be configured to use one or more machine learning models (e.g., stored in the third party database 115) to receive or extract the third party information, such as the category. For example, the machine learning models may be trained using historical data stored within the third party database 115. The various machine learning models may include neural networks (e.g., convolutional neural networks, deep neural networks), Support Vector Machines (SVMs), Random Forests, or the like. The machine learning models may be trained on known input-output pairs given known inputs. For example, the machine learning models may be trained to predict an organization category based on a plurality of known inputs and outputs (e.g., keyword associations, transaction history, etc.) By way of example, the visuals circuit 135 may be configured to receive third party information from the third party system 170 during a registration process. The visuals circuit 135 may be configured to extract a plurality of instances of the words "kitten" and "rescue" provided by the third party entity. The visuals circuit 135 may be configured to use the one or more machine learning models to determine, based on previous third party information of other third party entities, that the words "kitten" and "rescue" are associated with the category of animals. The visuals circuit 135 may be configured to store the third party information within the third party database 115 (e.g., as known inputs and outputs to facilitate training the machine learning models).

In some implementations, the visuals circuit 135 may be configured to receive the third party information of the one or more third party systems 170 via an API. For example, the visuals circuit 135 may be configured to cause a server of the institution computing system 105 to transmit one or more API calls to a third party system 170 including a request for the predetermined third party information. The visuals circuit 135 may be configured to receive the requested third party information responsive to the institution computing system 105 receiving a response to the transmitted API calls.

In some implementations, the visuals circuit 135 may be configured to verify the third party information prior to, simultaneously with, and/or after requesting the third party information of the third party system 170. For example, the visuals circuit 135 may be structured to transmit information only with known and trusted organization sites (e.g., secured websites having an "https" address, a predetermined listing of known organization sites or exposed APIs, etc.). The visuals circuit 135 may be configured to verify the third party information responsive to receiving information from the known websites and/or APIs.

At process 210, the visuals circuit 135 parses a web page for a content item. For example, if the visuals circuit 135 receives a URL with the third party information, the visuals circuit 135 may be configured to extract the received URL from the third party information and use one or more web scraping algorithms and/or image recognition logic to scrape publicly available information of a web page associated with the URL, for images, videos, or other media-based content items associated with the third party entity. As used herein, the term "scrape" or "scraping" refers to the process of extracting data from a website. In some implementations, the visuals circuit 135 may be configured to determine no URL was received for at least one third party system 170 (e.g., responsive to a user input the selectable feature 325 and/or responsive to the website input 315 being blank or empty). In these instances, the visuals circuit 135 may not parse any web page associated with the third party system 170, as described in greater detail herein.

At process 215, the visuals circuit 135 extracts the one or more content items scraped from the web page of the third party system 170. For example, the visuals circuit 135 may be configured to pull one or more content items (e.g., any images, videos, and/or other media) from the web page and aggregate the content items together. The visuals circuit 135 may be configured to tag or embed the one or more extracted content items with a name of the third party system 170 and/or with a category type of the third party system 170 (e.g., based on the received third party information during registration). In some implementations, the visuals circuit 135 may not detect any audio or visual content items publicly available on a web page of the third party system 170 (e.g., the web page is only text, etc.). In these instances, the visuals circuit 135 may not extract one or more content items of the web page associated with the URL.

At process 220, the visuals circuit 135 stores the one or more extracted content items and/or additional third party information (e.g., the category type) in the third party database 115. In some implementations, the visuals circuit 135 may be configured to store the one or more extracted content items with the tag of the category type of the third party system 170.

At process 225, the visuals circuit 135 compares the received category type of the third party system 170 with a plurality of category types stored in the stock visuals database 120. For example, the visuals circuit 135 may be configured to compare the received selected category type of the third party system 170 with the plurality of stored category types by comparing keywords between the data sets to determine if the received category type matches any of the stored category types in the stock visuals database 120.

At process 230, the visuals circuit 135 determines if the received category type of the third party system 170 matches at least one of the plurality of category types stored in the stock visuals database 120. Responsive to determining the received category type does not match any of the plurality of category types, the visuals circuit 135 may be configured to return to process 205 and receive third party information of another third party system 170. In some implementations, responsive to determining the received category type does not match any of the plurality of category types, the visuals circuit 135 may be configured to proceed to processes 240 and/or 245 to present a user interface to the user device 150 without any stock images. Responsive to determining the received category type does match at least one of the plurality of category types, the visuals circuit 135 may be configured to proceed to process 235.

At process 235, the visuals circuit 135 may be configured to pull or retrieve at least one stock image and/or video associated with the matching category type from the stock visuals database 120. For example, in some implementations, the visuals circuit 135 may be configured to pull at least one stock image or video from the stock visuals database 120 responsive to determining that no URL was received with the third party information (e.g., to cause the user device 150 to render at least one image associated with a third party system 170, as described herein, even when the third party system 170 has not provided a URL). In some implementations, the visuals circuit 135 may be configured to pull at least one stock image or video from the stock visuals database 120 responsive to determining that no images and/or videos were extracted from the web page of the third party system 170 (e.g., to cause the user device 150 to render at least one image associated with a third party system 170, as described herein, even when the third party system 170 has no publicly available images on its web page). In some implementations, the visuals circuit 135 may be configured to pull at least one stock image or video from the stock visuals database 120 responsive to extracting one or more images or videos from the web page of the third party system 170 (e.g., to supplement images associated with a third party system 170, as described herein, even when the third party system 170 has publicly available images on its web page).

Figure 4A:
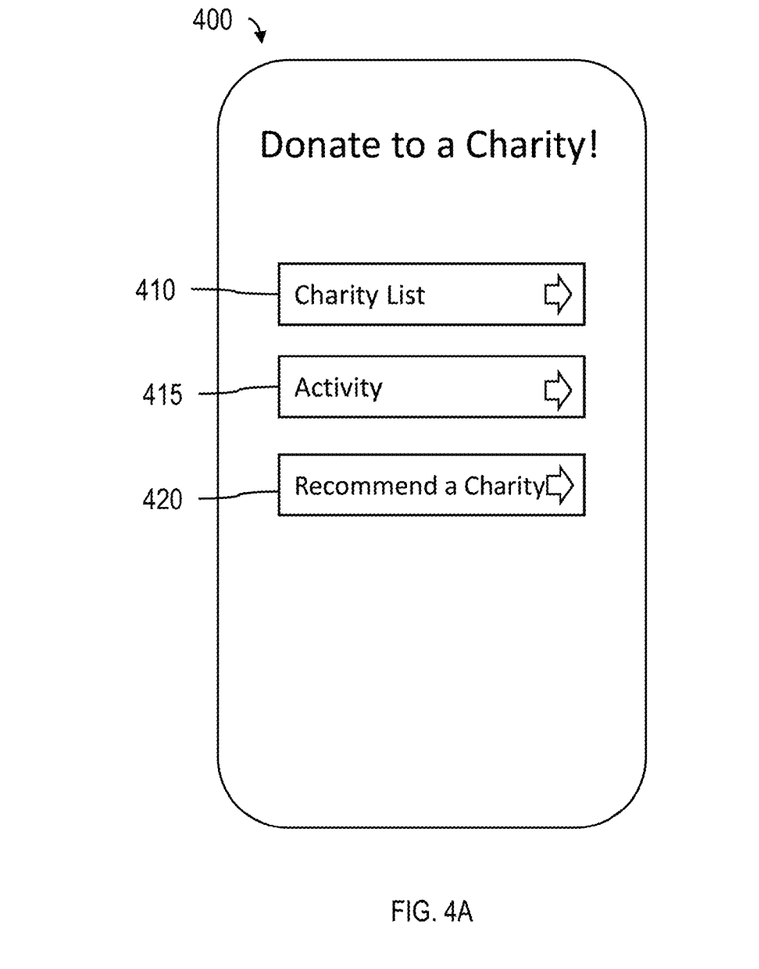
FIGS. 4A-4F are dynamic graphical user interfaces presented to a customer during a donation process, according to example embodiments.
Figure 4B:
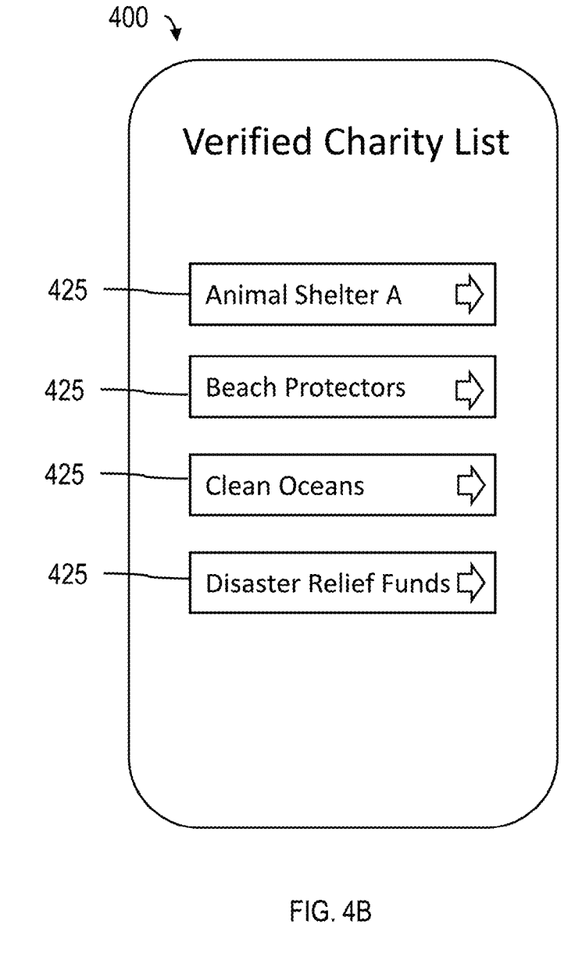

At process 240, the visuals circuit 135 may be configured to generate and provide a graphical user interface having a graphical representation of a third party system 170 by transmitting data corresponding to the graphical user interface for rendering on the user device. For example, the visuals circuit 135 may be configured to generate and provide a user interface 400 to a user device 150 during a donation process, as depicted in FIGS. 4A and 4B. In some implementations, the visuals circuit 135 may be configured to generate and provide the user interface 400 to the user device 150 responsive to the client application 155 launching on the user device 150, responsive to receiving log-in credentials to the client application 155 on the user device 150, and/or responsive to receiving registration information for a user account of the client application 155. In some implementations, the visuals circuit 135 may be configured to generate and provide the user interface 400 to the user device 150 responsive to receiving an input to the client application 155 indicating a user wishes to make a donation or other transaction to a third party entity (e.g., charity or non-profit organization) of third party systems 170 registered with the donation service of the institution computing system 105.

As depicted in FIG. 4A, a first user interface 400 provided to the user device 150 may include multiple selectable features for a user of the user device 150 to select. For example, the user interface 400 may include a charity list input 410, an activity input 415, and/or a charity recommendation input 420. Responsive to receiving an input to the activity input 415, the visuals circuit 135 may be configured to automatically pull historical transaction data stored in the accounts database 110 for an account associated with the user device 150 and cause the user device 150 to render the historical transaction data on the user interface 400. Responsive to receiving an input to the charity recommendation input 420, the visuals circuit 135 may be configured to cause the user device 150 to render a prompt (e.g., dialogue box) on the user interface 400 for a user to enter a new charity name. For example, the prompt may include one or more selectable features for a user to input predetermined charity information including, but not limited to, a name of the charity, a location of the charity, a type and/or category of the charity, among other information. Responsive to receiving the recommended charity information, the visuals circuit 135 may be configured to verify the received information by requesting information from the charity (e.g., third party system 170) directly and comparing the received information from the third party system 170 with the received charity information from the user device 150.

Responsive to receiving an input to the charity list input 410, the visuals circuit 135 may be configured to generate and provide a second user interface 400 and/or a second window on the user interface 400 including a list of third party systems 170 that have registered for the donation service of the institution computing system 105 (e.g., at process 205). The user interface 400 may include at least one selectable graphical representation 425 of each third party system 170 rendered on the user interface 400. For example, each graphical representation 425 may include at least one indication of the corresponding third party system 170 (e.g., a name associated with the third party system entity, an image or icon associated with the third party entity, and/or various other information). In some implementations, the graphical representation 425 may only include a name of the third party systems 170. The listing of third party systems 170 may be rendered in various manners including, but not limited to, alphabetically, random, most commonly selected, etc.

At process 245, the visuals circuit 135 may be configured to receive an input to the user interface 400 indicating a selection of a graphical representation 425 of the third party system 170. For example, a user of the user device 150 may select one of the selectable graphical representations 425 of the third party system 170 to learn more information about the third party system 170 and/or to make a donation to the third party entity associated with the third party system 170. Responsive to receiving an input to a graphical representation 425, the visuals circuit 135 may be configured to cause the user device 150 to render various information about the corresponding selected third party system 170.

For example, at process 250, the visuals circuit 135 may be configured to generate and provide another user interface 405 including the extracted content items from the web page of the third party system 170 and/or one or more pulled images and/or videos stored in the stock visuals database 120 corresponding to the matching category type of the third party system 170, as depicted in FIGS. 4C-4F, which depict various implementations of the user interface 405. For example, the visuals circuit 135 may be configured to generate and provide the user interface 405 responsive to receiving an input to a graphical representation 425. The user interface 405 may include various information of the corresponding third party system 170 associated with the selected graphical representation 425.

Figure 4C:
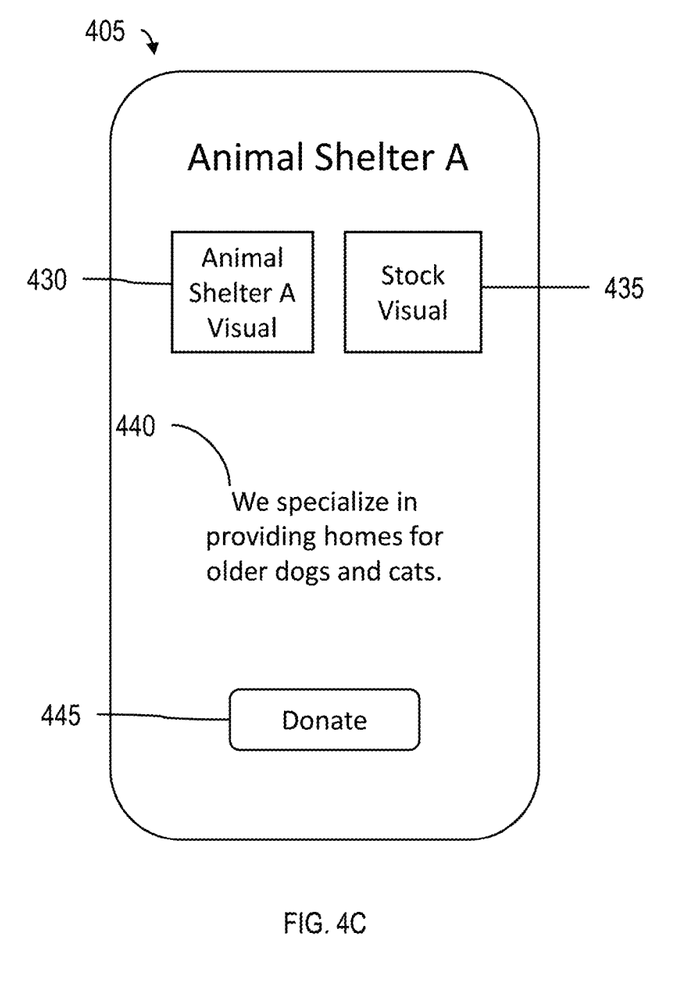

For example, as depicted in FIG. 4C, the user interface 405 may include at least one image 430 or other media that was extracted from the web page of the selected third party system 170 and/or at least one stock image 435 pulled from the stock visuals database 120. In some implementations, the visuals circuit 135 may be configured to cause the user device 150 to render the one or more stock images 435 to supplement the images 430 or other media pulled from the web page of the third party system 170. For example, in instances in which the web page of the third party system 170 only has a few images or videos (e.g., 1-3), the visuals circuit 135 may be configured to pull at least one stock image 435 to cause the user device 150 to render on the user interface 405 with the extracted images 430 or other media. In some implementations, the user interface 405 may include only images 430 or other media pulled from the web page of the third party system 170.

Figure 4D:
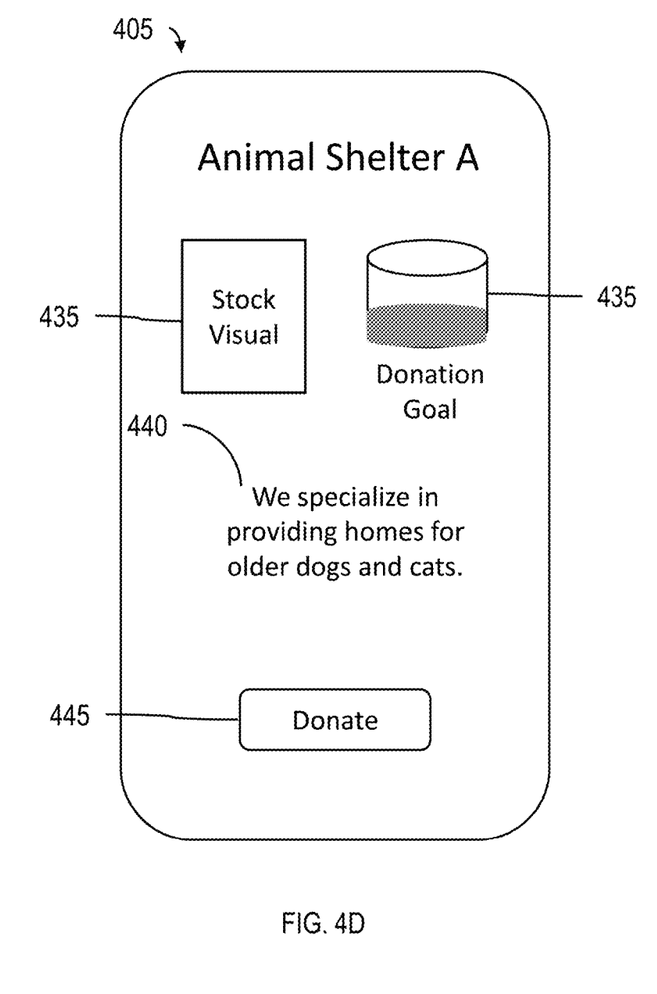

In some implementations, the user interface 405 may include only stock images 435 or other media (e.g., when the web page of the third party system 170 does not include any media and/or when the third party system 170 does not have a web page). For example, as depicted in FIG. 4D, the user interface 405 may include at least one stock image 435 associated with a corresponding category type of the third party system 170. In some implementations, at least one of the stock images 435 or other media may include a graphical representation indicating a status of the third party system 170. For example, the stock image 435 or other media may include a stock graphical representation modified specifically to a third party system 170 such as, for example, a graphical representation indicating a donation goal of the third party system 170, as depicted in FIG. 4D. For example, the graphical representation may include a bar graph, a line graph, a partially filled cylinder/thermometer, and/or various other graphics that represent a donation status of the corresponding third party system 170. For example, to cause the user device 150 to render the stock image/graphic 435, the visuals circuit 135 may be configured to extract, from the third party database 115, a received donation goal of the third party system 170 with the third party information. The visuals circuit 135 may be configured to compare the donation goal of the third party system 170 with any transactions associated with an account of the third party system 170 stored in the third party database 115 and/or the accounts database 110 to determine a difference between the sum of transactions and the donation goal. The visuals circuit 135 may be configured to pull, from the stock visuals database 120, the stock image/graphic 435 and configure the stock image/graphic 435 to reflect the difference.

Figure 4E:
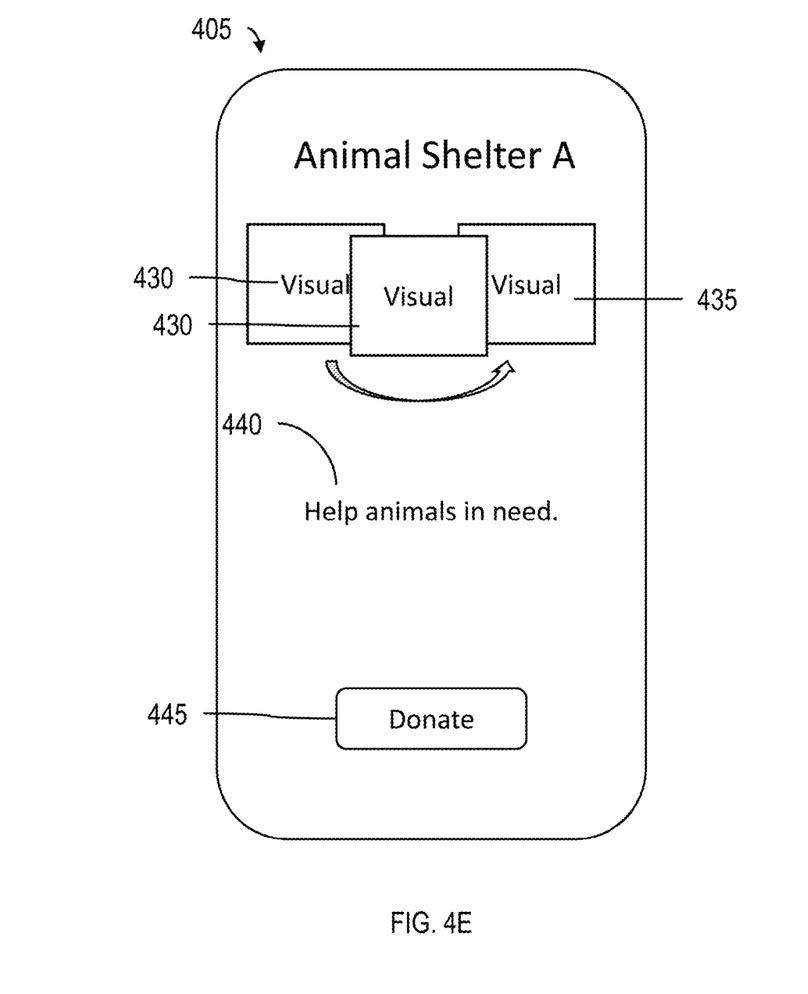

In some implementations, the user interface 405 may include a plurality of images or other media dynamically moving or updating position on the user interface 405. For example, as depicted in FIG. 4E, the user interface 405 may include a plurality of extracted images 430 or other media and/or a plurality of stock images 435 or other media dynamically moving around the user interface 405. In some implementations, the visuals circuit 135 may be configured to shuffle through the plurality of extracted images 430 or other media and/or a plurality of stock images 435 on the user interface 405 such that the user interface 405 displays a random set of images for a predetermined period of time (e.g., 5 seconds, 10 seconds, etc.) and/or a predetermined set of images for a predetermined period of time. In some implementations, the visuals circuit 135 may be configured to shuffle through a predetermined set of extracted images 430 and/or stock images 435 such that each image move around a point on the user interface 405. In some implementations, the visuals circuit 135 may be configured to cause the user device 150 to render a different set of extracted images 430 and/or stock images 435 each time the visuals circuit 135 receives an input to the corresponding graphical representation 425 (e.g., each time a user interface 405 identifying information of a third party system 170 is launched) and/or each time the client application 155 is launched on the user device. For example, the visuals circuit 135 may be configured to cause the user device 150 to render a new image or other media on the user interface 405 each time the respective third party system 170 (and/or the client application 155) is selected.

During a donation process as described herein, rendering information on the user interface 405 of the user device 150 regarding a third party system 170 (such as images, videos, and/or other information) may facilitate ensuring a user of the user device 150 that the donation is not fraudulent. However, conventional techniques for extracting various media from a web page using one or more web scraping algorithms can be resource intensive and often requires a large amount of processing power due to the intensity of the processes performed. Therefore, utilizing a stock visuals database 120 to replace and/or supplement any scraped images to provide on the user interface 405 significantly reduces computing resources and processing power. Additionally, combining scraped images and stock images is unconventional in view of conventional techniques.

In some implementations, the user interface 405 may include at least one description 440 of the third party system 170. For example, as depicted in FIGS. 4C-4E, the visuals circuit 135 may be configured to extract, from the third party database 115, a received description of the third party system 170 from the received third party information and render the description on the user interface 405. In some implementations, the visuals circuit 135 may be configured to extract the description 440 from the web page of the third party system 170 (e.g., using one or more scraping algorithms).

Figure 4F:
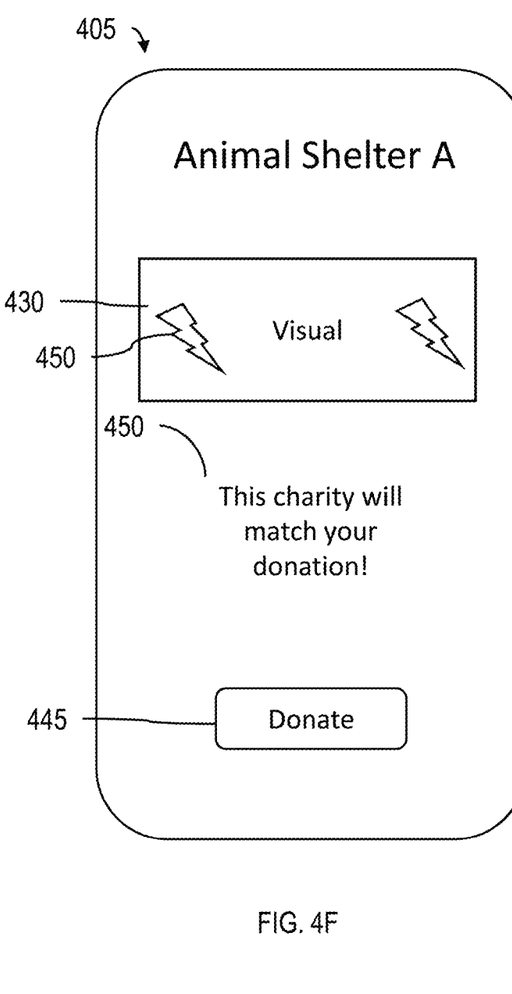

In some implementations, the user interface 405 may include at least one feature 450 that indicates that a respective third party system 170 will match any donation made. For example, the visuals circuit 135 may be configured to pull, from the third party database 115, data received from the third party system 170 indicating whether the third party system 170 chooses to match donations. Responsive to determining the third party system 170 does match donations, the visuals circuit 135 may be configured to cause the user device 150 to render the feature 450 on the user interface 405. For example, as depicted in FIG. 4F, the feature 450 may include at least one color effect (e.g., highlighting, bolding, showing a specific color, etc.), lighting effect (e.g., blinking, flashing, etc.), and/or at least one sound or haptic effect (e.g., a noise, vibration, etc.) to indicate that a third party system 170 matches donations made. In some implementations, the feature 450 may include at least one text that indicates that the third party system 170 matches any donations made. In some implementations, the feature 450 may indicate that the third party system 170 will round up a donation (e.g., round to the nearest $1, the nearest $10, etc.), add a certain amount to a donation, and/or various other actions to encourage a user to make a donation.

The user interface 405 and/or the first user interface 400 may include at least one donation icon 445. The donation icon 445 may be selectable such that the visuals circuit 135 may be configured to receive a manual input to the donation icon 445. For example, a selection of the donation icon 445 may indicate a user wishes to contribute a donation to the corresponding third party system 170.

Responsive to receiving an input to the donation icon 445, the visuals circuit 135 may be configured to cause an initiation of a transaction between a sender (e.g., an account associated with the user of the user device 150) and a recipient (e.g., a third party account associated with the third party system 170). To initiate the transaction, the visuals circuit 135 may be structured to transmit transaction information to a third party service provider, such as Early Warning Service (EWS). For example, the transaction information may include, among other information, the name of the third party entity and an amount of the transaction. The visuals circuit 135 may be configured to cause the third party service provider to parse stored information and determine a registered token associated with the received name to initiate a transfer of funds in the amount of the transaction. In some implementations, the visuals circuit 135 may be configured to receive transaction information from the third party service provider (e.g., EWS) to complete the transfer of funds (e.g., an indication of a confirmation of the registered token such that the institution computing system 105 may cause the funds to be transferred).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computing system associated with a provider institution, comprising:
   a network interface configured to communicate with a user device and a plurality of third party systems;
   a database structured to store a plurality of stock images or videos associated with a plurality of categories; and
   at least one processing circuit comprising one or more processors and memory structured to store instructions that are executable to cause the at least one processing circuit to:
      receive, via the network interface, a uniform resource location (URL) associated with a web page and a category type of a first third party system of the plurality of third party systems;
      parse the web page associated with the URL to extract a content item from the web page, the content item comprising an audio or visual content item;
      determine the category type matches a category of the plurality of categories stored in the database based on a comparison of the received category type with the plurality of categories;
      retrieve, from the database, at least one image or video associated with the category;
      receive, via the network interface, from the first third party system, a goal value and a status value associated with the first third party system;
      receive, via the network interface, a user input indicating a selection of a graphical representation of the first third party system on a first graphical user interface (GUI) rendered by the user device;
      responsive to receiving the selection, generate a second GUI including a second graphical representation of the first third party system, the extracted content item, and the at least one image or video retrieved from the database, wherein the at least one image or video is configured to reflect a difference between the goal value and the status value; and
      transmit, via the network interface, data corresponding to the second GUI for rendering to the user device.

2. The computing system of claim 1, wherein the instructions are further configured to cause the at least one processing circuit to:
   transmit, via the network interface, to a device corresponding to the first third party system, a request to enroll in a service, wherein the request includes a field for receiving the category type and the URL; and
   receive, via the network interface, a response to the request, the response identifying the category type and the URL.

3. The computing system of claim 1, wherein the instructions are further configured to cause the at least one processing circuit to:
   receive, via the network interface, a second URL associated with a second web page and a second category type of a second third party system of the plurality of third party systems;
   parse the second web page for at least one audio or visual content item;
   determine the second web page does not comprise the at least one audio or visual content item;
   responsive to determining the second web page does not comprise the at least one audio or visual content item, compare the received second category type with the plurality of categories stored in the database;
   determine the second category type matches a category of the plurality of categories;
   retrieve at least one second image or video associated with the category from the database;
   generate a third GUI including the retrieved at least one second image or video; and
   provide, via the network interface, the third GUI to the user device.

4. The computing system of claim 1, further comprising a second database configured to store a plurality of accounts held by the provider institution, wherein the instructions are further configured to cause the at least one processing circuit to:
   receive, via the network interface, data corresponding to a third party account from the first third party system;
   receive, via the network interface and via an input to the second GUI, an indication to transmit funds to the first third party system; and
   responsive to receiving the input, initiate a transfer of funds from an account of the plurality of accounts stored in the second database to the third party account.

5. The computing system of claim 1, wherein retrieving the at least one image or video comprises retrieving a first image or video and a second image or video, the second GUI comprises the first image or video, and the instructions are further configured to cause the at least one processing circuit to:
generate a third GUI including the extracted content item and the second image or video retrieved from the database; and
provide, via the network interface, the third GUI to the user device.

6. The computing system of claim 1, wherein the instructions are further configured to cause the at least one processing circuit to:
receive, via the network interface, a user input indicating a selection of the second graphical representation of the first third party system on the second GUI;
responsive to receiving the selection of the second graphical representation of the first third party system on the second GUI, generate a third GUI including the extracted content item and at least one other image or video retrieved from the database, wherein a position of the extracted content item on the third GUI differs from a position of the extracted content item on the second GUI; and
transmit, via the network interface, data corresponding to the third GUI for rendering to the user device.

7. The computing system of claim 1, wherein parsing the web page associated with the URL for at least one content item comprises extracting, via one or more web scraping algorithms, the at least one content item from the web page.

8. A computer-based method, comprising:
receiving, by a computing system of a provider institution, a uniform resource location (URL) associated with a web page and a category type of a first third party system of a plurality of third party systems;
parsing, by the computing system, the web page associated with the URL to extract a content item from the web page, the content item comprising an audio or visual content item;
determining, by the computing system, the category type matches a category of a plurality of categories stored in a database of the provider institution, based on a comparison of the received category type with the plurality of categories;
retrieving, from the database, by the computing system, at least one image or video associated with the category;
receiving, by the computing system, from the first third party system, a goal value and a status value associated with the first third party system;
receiving, by the computing system, a user input indicating a selection of a graphical representation of the first third party system on a first graphical user interface (GUI) rendered by a user device;
responsive to receiving the selection, generating, by the computing system, a second GUI including a second graphical representation of the first third party system, the extracted content item, and the at least one image or video retrieved from the database, wherein the at least one image or video is configured to reflect a difference between the goal value and the status value; and
transmitting, by the computing system, data corresponding to the second GUI for rendering to the user device.

9. The method of claim 8, further comprising:
transmitting, by the computing system, to a device corresponding to the first third party system, a request to enroll in a service, wherein the request includes a field for the category type and the URL; and
receiving, by the computing system, a response to the request, the response identifying the category type and the URL.

10. The method of claim 8, further comprising:
receiving, by the computing system, a second URL associated with a second web page and a second category type of a second third party system of the plurality of third party systems;
parsing, by the computing system, the second web page for at least one audio or visual content item;
determining, by the computing system, the second web page does not comprise the at least one audio or visual content item;
responsive to determining the second web page does not comprise the at least one audio or visual content item, comparing, by the computing system, the received second category type with the plurality of categories stored in the database;
determining, by the computing system, the second category type matches a category of the plurality of categories;
retrieving, by the computing system, at least one second image or video associated with the category from the database;
generating, by the computing system, a third GUI including the retrieved at least one second image or video; and
providing, by the computing system, the third GUI to the user device.

11. The method of claim 8, further comprising:
receiving, by the computing system, data corresponding to a third party account from the first third party system;
receiving, by the computing system and via an input to the second GUI, an indication to transmit funds to the first third party system; and
responsive to receiving the input, initiating, by the computing system, a transfer of funds from an account stored in a second database to the third party account.

12. The method of claim 8, wherein retrieving the at least one image or video comprises retrieving a first image or video and a second image or video, the second GUI comprises the first image or video, and the method further comprises:
generating, by the computing system, a third GUI including the extracted content item and the second image or video retrieved from the database; and
providing, by the computing system, the third GUI to the user device.

13. The method of claim 8, further comprising dynamically updating, by the computing system, a position of the at least one image or video of the second GUI over a predetermined period of time.

14. The method of claim 8, wherein parsing the web page associated with the URL for at least one content item comprises extracting, via one or more web scraping algorithms, the at least one content item from the web page.

15. A non-transitory computer readable medium storing instructions that, when executed by at least one processor, cause the at least one processor to:
receive, via a network interface, a uniform resource location (URL) associated with a web page and a category type of a first third party system of a plurality of third party systems;

parse the web page associated with the URL to extract a content item from the web page, the content item comprising an audio or visual content item;
determine the category type matches a category of a plurality of categories stored in a database, based on a comparison of the received category type with the plurality of categories;
retrieve, from the database, at least one image or video associated with the category;
receive, via the network interface, from the first third party system, a goal value and a status value associated with the first third party system;
receive, via the network interface, a user input indicating a selection of a graphical representation of the first third party system on a first graphical user interface (GUI) rendered by a user device;
responsive to receiving the selection, generate a second GUI including a second graphical representation of the first third party system, the extracted content item, and the at least one image or video retrieved from the database, wherein the at least one image or video is configured to reflect a difference between the goal value and the status value; and
transmit, via the network interface, data corresponding to the second GUI for rendering to the user device.

16. The non-transitory computer readable medium of claim 15, wherein the instructions are further configured to cause the at least one processor to:
transmit, via the network interface, to a device corresponding to the first third party system, a request to enroll in a service, wherein the request includes a field for receiving the category type and the URL; and
receive, via the network interface, a response to the request, the response identifying the category type and the URL.

17. The non-transitory computer readable medium of claim 15, wherein the instructions are further configured to cause the at least one processor to:
receive, via the network interface, a second URL associated with a second web page and a second category type of a second third party system of the plurality of third party systems;
parse the second web page for at least one audio or visual content item;
determine the second web page does not comprise the at least one audio or visual content item;
responsive to determining the second web page does not comprise the at least one audio or visual content item, compare the received second category type with the plurality of categories stored in the database;
determine the second category type matches a category of the plurality of categories;
retrieve at least one second image or video associated with the category from the database;
generate a third GUI including the retrieved at least one second image or video; and
provide, via the network interface, the third GUI to the user device.

18. The non-transitory computer readable medium of claim 15, wherein the instructions are further configured to cause the at least one processor to:
receive, via the network interface, data corresponding to a third party account from the first third party system;
receive, via the network interface and via an input to the second GUI, an indication to transmit funds to the first third party system; and
responsive to receiving the input, initiate a transfer of funds from an account stored in a second database to the third party account.

* * * * *